July 5, 1960 E. W. D'ARCY 2,943,860

ADJUSTABLE HEAD MOUNT

Filed Nov. 13, 1956 4 Sheets-Sheet 1

INVENTOR.
Ellis W. D'Arcy
BY
L. F. Hammond
Atty.

July 5, 1960 E. W. D'ARCY 2,943,860

ADJUSTABLE HEAD MOUNT

Filed Nov. 13, 1956 4 Sheets-Sheet 2

INVENTOR.

Ellis W. D'Arcy

BY

L. F. Hammond

Atty.

ADJUSTABLE HEAD MOUNT

Filed Nov. 13, 1956 4 Sheets-Sheet 3

INVENTOR.
Ellis W. D'Arcy
BY
L. F. Hammond
Atty.

July 5, 1960 E. W. D'ARCY 2,943,860

ADJUSTABLE HEAD MOUNT

Filed Nov. 13, 1956 4 Sheets-Sheet 4

INVENTOR.
Ellis W. D'Arcy
BY
L. F. Hammand.
Atty.

United States Patent Office 2,943,860

Patented July 5, 1960

2,943,860

ADJUSTABLE HEAD MOUNT

Ellis W. D'Arcy, Box 1103, Ogden Dunes, Gary, Ind.

Filed November 13, 1956, Ser. No. 621,914

6 Claims. (Cl. 274—4)

This invention relates to magnetic sound reproduction apparatus, and particularly to an improved mounting for the magnetic pick-up head of a motion picture projector. In its broadest aspect, it is a primary object of the invention to provide a mounting so designed that the magnetic sound head will be capable of high fidelity reproduction from a sound track comprising a magnetic stripe along one edge of a motion picture film. More specifically, it is an object of the invention to provide supporting and adjusting instrumentalities for the magnetic reproducing head capable of maintaining the flux gap of the head in perfectly matched surface-to-surface contact with the oxide layer comprising the sound stripe on the film, with uniform surface pressure. This requires much more than merely drawing the film across the sound head with the stripe on the film bridging the flux gap since, for proper sound reproduction, the flux gap must also be maintained precisely aligned with the film surface as to tangency, facing, and azimuth, as well as being held in proper tracking relation. The accomplishment of these conditions in a movie projector involves the solution of problems not present in magnetic tape or wire recorders or reproducers. This is for several reasons, but particularly because of the fact that in most types of magnetic recording equipment the record, be it tape or wire, is quite flexible and yielding, so that it lends itself to proper tracking, with smooth sliding contact when drawn across the face of a stationary sound head. Thus, in a typical tape recorder, the tape may be of relatively soft, pliable material and only about .002 inch thick, so that it has adequate compliance to maintain smooth and constant surface-to-surface contact with the flux gap of a pick-up or recording head, even though the tension of the tape may vary considerably from time to time and even in spite of other variable factors. In the case of a motion picture projector, however, the film is of strip celluloid, which is quite hard and stiff, with sufficient thickness and width to give it a decided tendency to warp, buckle or acquire a permanent set in portions of its length. It follows that the film is incapable of the degree of compliance necessary to maintain proper surface contact with the flux gap of the head, and that in order to maintain perfect sliding contact with an oxide sound stripe disposed along one side of a film it is necessary that means be provided whereby the sound head itself is capable of the requisite degree of compliance. This must be accomplished, however, without causing variations in adjustment as to tangency or facing of the head with respect to the film, and while maintaining the flux gap extending across the film stripe in exactly the same azimuth relation as during the recording of the sound thereon.

It is accordingly one of the principal objects of the invention to provide an improved mounting for a magnetic reproducing head with adjusting means for setting the tangency of the head with respect to the film and separate adjusting means for correcting its facing thereon and for fixing the proper azimuth relation between the flux gap and the sound stripe of the film, yet with an arrangement of parts wherein the head itself is mounted in a mannner to provide enough compliance to allow the head to faithfully follow the movement of the film.

A further important object is the provision of adjusting means as outlined above wherein corrections of adjustment in each of the three particulars noted may be accomplished without disturbing any other adjustments previously made. A still further object of the invention is to provide a reproducing head mount capable of achieving the required degree of compliance, yet wherein the head is supported in a steady, firm manner, with uniformity of contact pressure against the film and without undue tendency toward vibration, play, looseness or wobble.

A further object of the invention is to provide an improved mounting for the magnetic pick-up head of a motion picture projector wherein the cooperating parts are so designed and arranged that the unit may be adapted for easy attachment on existing types of equipment; particularly on motion picture projectors originally arranged for use with an optical sound track. This involves mechanical design of the parts of the mount in extremely simple form and compact arrangement; dimensioned to be received in the very limited space ordinarily provided between the frame and the innermost surface of the sound drum of a conventional motion picture projector.

A still further object is to provide an improved magnetic head mount capable of quick, easy and simple adjustment in respect to tangency, facing and azimuth; yet with the several parts of the mechanism so arranged as to be easily accessible and capable of convenient adjustment without stopping the mechanism or interrupting the movement of the film. With this arrangement, the quality of the sound reproduced by the apparatus may be noted as the adjustments are made, and any inaccuracy of adjustment may be quickly corrected "by ear."

The foregoing objects are accomplished in this disclosure by the provision of an extremely simple and compact group of the interrelated parts capable of supporting a miniature sound pick-up head in contact with the inside concave surface of an overhanging edge of film passing around the sound head of a conventional motion picture projector. In the preferred construction, the entire assembly of the essential mounting parts is considerably less than an inch in any dimension, so that the entire assembly may be nested between the back of the sound drum and the frame of the projector.

In its basic essentials, the mount consists of a primary supporting bracket (mounted directly on the frame of the projector) carrying a secondary supporting bracket, which in turn supports a head carrier bracket having a spring hinge adapted to provide a limited degree of yieldability for the pick-up head supported thereby. Adjustment as to tangency, facing and azimuth are accomplished by shiftable pivoted connections between these parts, and locking screws are provided for all adjustments, to hold the entire assembly in perfectly rigid, steady, vibrationless condition when the optimum adjustment has been accomplished.

For purposes of illustration of the principles involved in this invention, a form of the invention specifically designed for use in connenction with a typical RCA projector has been chosen as illustrative of the inventive concept. This construction is shown in the drawings attached to and forming a part of the present specification, wherein.

Figure 8:
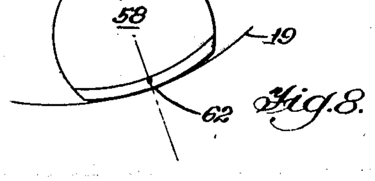
Figures 2, 7:
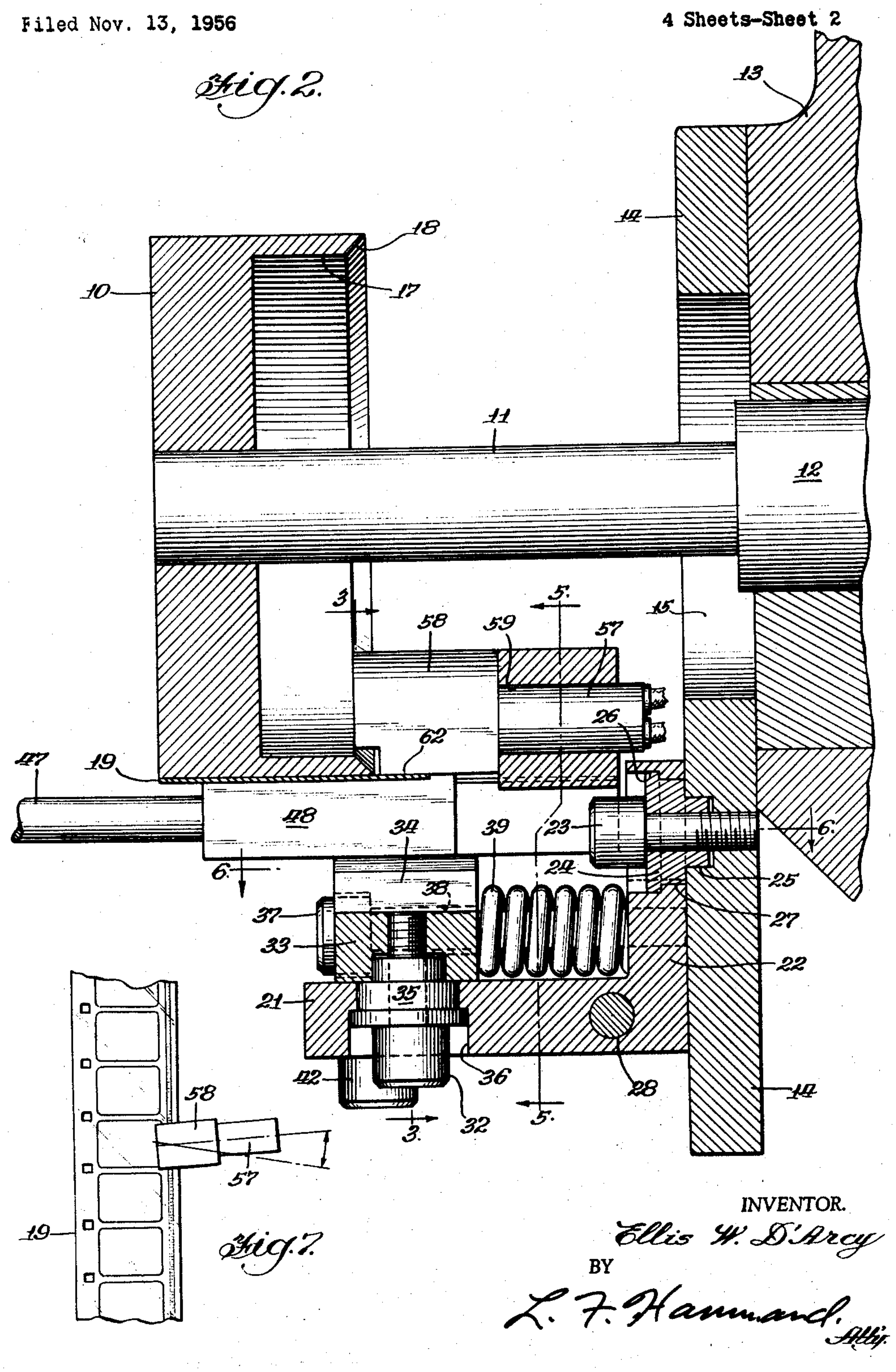
Figure 2 is a vertical sectional view through the head mount assembly, the view being taken through the sound drum of the projector and the mounting and substantially on the plane of the line 2—2 of Figure 1.
Figure 9:
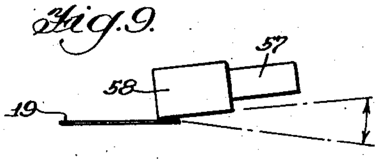

Figure 7 is a diagrammatic illustration of the effect of changes in azimuth adjustment of the magnetic pick-up head; Figure 8 is a diagrammatic illustration of the effect of changes in tangency adjustment; and Figure 9 is a diagrammatic illustration of the effect of changes in facing adjustment, it being undertood that the range of adjustment in each of these cases is exaggerated to more clearly demonstrate the effect thereof.

In conventionoal motion picture sound equipment, it is customary to provide a so-called "sound drum" usually in the form of a film sprocket having teeth to engage the sprocket holes in the film and arranged with a constant speed driving mechanism so that the film is carried through the sound reproducing portion of the equipment at a fixed and uniform velocity. As illustrated in the present drawings, particularly Figures 1 and 2, the sound drum 10 is mounted on a rotary shaft 11 carried in bearings 12 in the frame 13 of the projector. In the specific type of projector chosen for illustration, the mechanism includes a small face plate 14 behind the drum 10 and cut away at 15 to surround the shaft 11 and bearing 12. The plate 14 is secured to the frame of the projector by a plurality of mounting screws 16.

As shown, the sound drum 10 is of conventional form, counterbored from the back side to provide an inwardly projecting flange 17, preferably tapered at its edge 18. This provides enough space behind the drum to permit mounting the mirror of a conventional sound pick-up system, but the present invention proposes to utilize this space to mount a magnetic sound head, positioned behind and partially under the flange of the drum, where it may be held in operative relationship with the concave inside face of the overhanging edge of the strip film 19 passing therearound.

Figure 1:
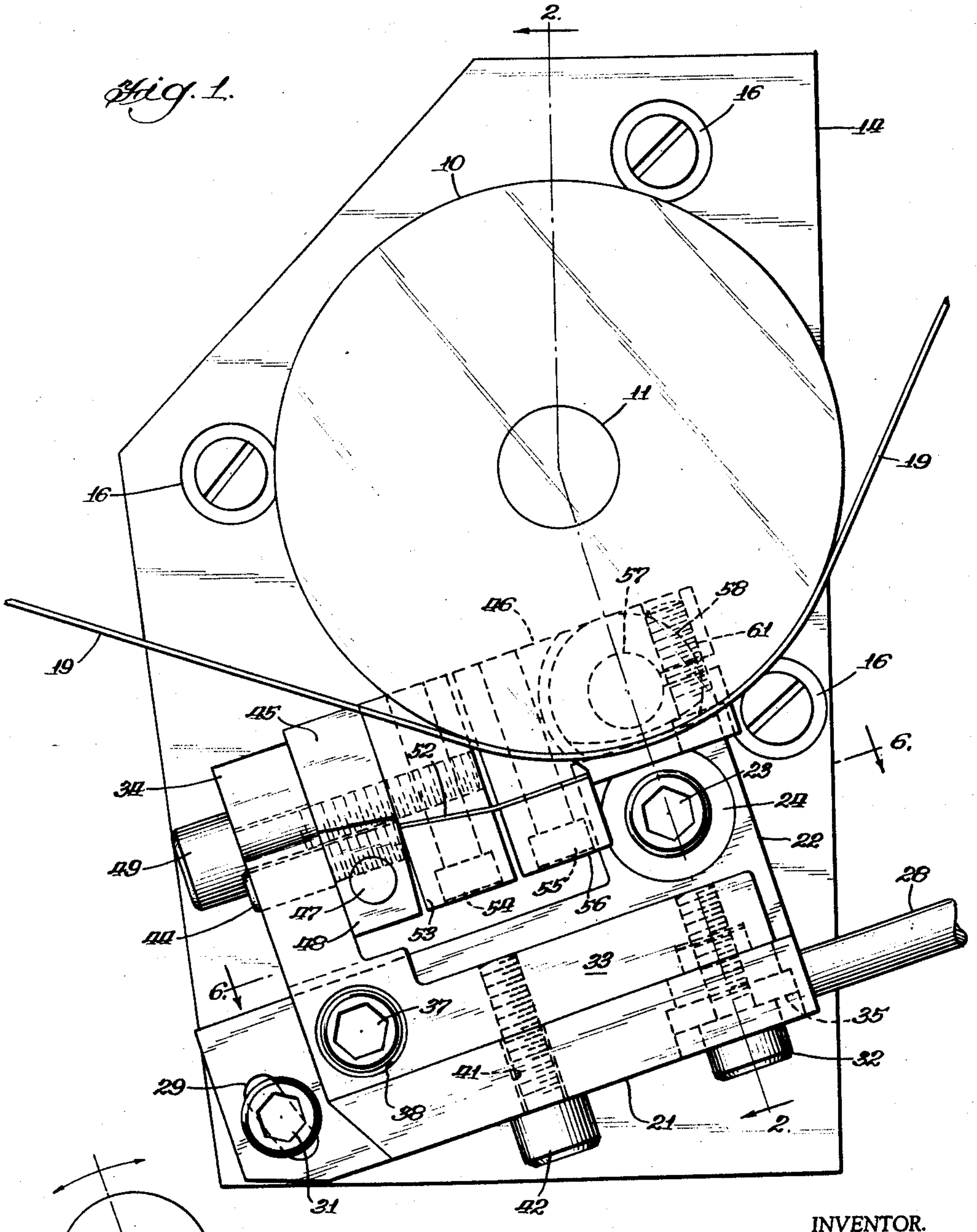
Figure 1 is a front elevational view of a head mount assembly as developed for this particular projector.
Figure 3:
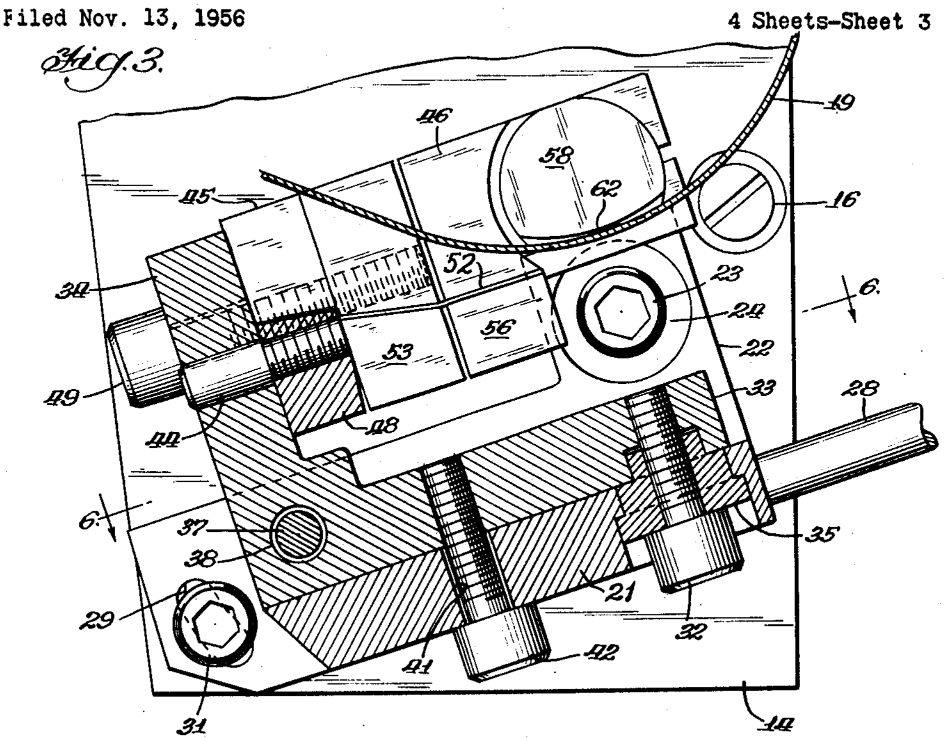
Figure 3 is a front cross sectional view taken substantially on the plane of the line 3—3 of Figure 2.

The entire head mount and all adjusting facilities thereof are mounted on the plate 14. The primary supporting bracket consists of a base 21 with an integral upright mounting flange 22 secured to the face plate 14 by a pivoted mount consisting of a single cap screw 23 arranged to clamp a shouldered bushing 24 into a recessed counterbore 25 in the plate 14. The bushing has an enlarged shouldered head 26 arranged to fit closely within a shouldered bore 27 on upright flange of the primary mounting bracket 21—22. The primary bracket 21—22 is thus arranged for pivotal adjustment around the screw 23. The base 21 is drilled to receive a small rod-like adjusting lever 28 projecting outwardly from the bracket as best seen in Figures 1 and 3 to facilitate manual adjustment of the bracket 21—22 for corrections in tangency, as will appear. An arcuate slot 29 in the flange 22 has a cap screw 31 extending therethrough and threaded into the face plate 14 to limit the range of adjustment and to lock the bracket 21—22 in position when proper adjustment has been made.

Figure 6:
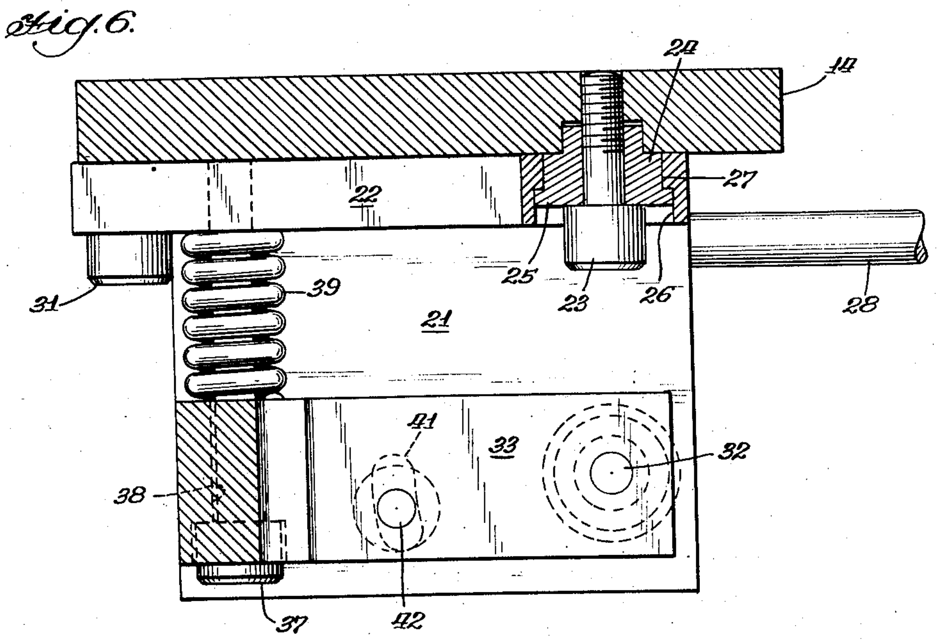
Figure 6 is a plan sectional view taken substantially on the plane of the line 6—6 of Figures 1 to 5 inclusive.

The projecting base 21 of the primary bracket supports the secondary bracket, which comprises a flat base 33 with an upstanding arm 34 at its left end (Figures 1 and 3). The secondary arm bracket 33—34 is also pivotally held to the bracket 21—22 by the cap screw 32 extending upwardly from the underside of the base 21 through the bushing 35. The secondary bracket 33—34 is thus pivotally adjustable about the axis of the screw 32 and bushing 35. In order to accomplish easy and precise shifting of the secondary bracket with respect to the base 21, an adjusting screw 37 is passed through a loose bore 38 and threaded into the upright plate 22 of the primary bracket (Figure 6). A compression spring 39 is fitted over the shank of the screw to urge the end of the secondary bracket 33—34 outwardly, while the screw 37 provides a means for pivoting the bracket in against the force of the spring. Precise adjustment of the angular position of the secondary bracket 33—34 with respect to its pivot may thus be made by loosening or tightening the screw 37. The pivotal movement is limited by the length of a slot 41 in the base 21, and a cap screw 42 is provided to lock the primary and secondary brackets in fixed adjustment with respect to each other.

Figure 4:
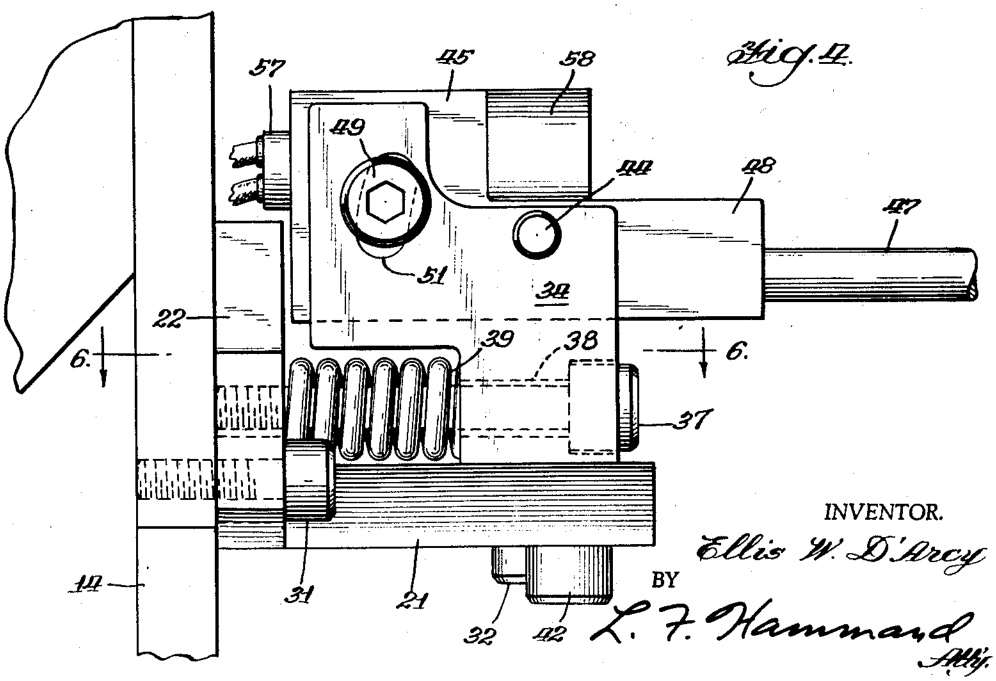
Figure 4 is an end elevational view taken from the left side of Figure 3.
Figure 5:
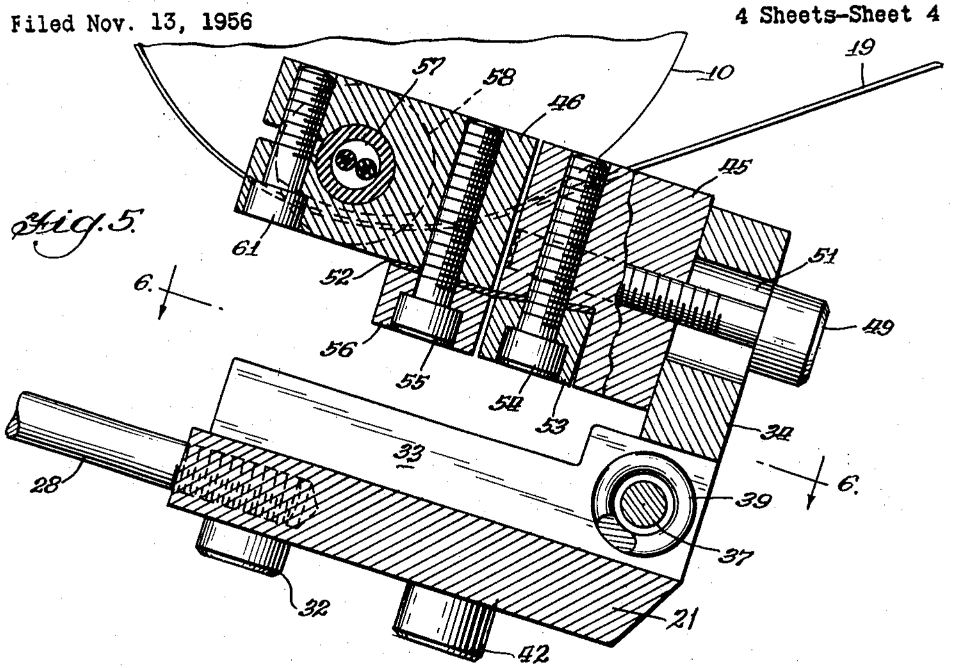
Figure 5 is a cross sectional view taken substantially on the plane of the line 5—5 of Figure 2.

The upstanding end arm 34 of the secondary bracket, the contour of which is best shown in Figure 4, is drilled to provide a bearing for a pivot pin 44 threaded into a head carrier bracket including a fixed carrier block 45 and a yieldable carrier 46. The fixed mounting block 45 has a slender rod-like control lever 47 threaded into an outwardly extending arm 48 to facilitate shifting the block and its associated parts. A screw 49 is threaded into the block 45 and extends through an arcuate slot 51 in the arm 34 to lock the parts in any desired position of adjustment with respect to the pivot 44.

The fixed block 45 serves as a mount for a thin flat leaf spring 52 secured between the fixed mounting block 45 and a cap 53 by a pair of cap screws 54. The other end of the spring supports the yieldable carrier 46 which is secured by cap screws 55 and a cap piece 56. The yieldable or "floating" carrier 46 has the shank portion 57 of sound head 58 mounted in a slotted bore 59, where it is clamped by screw 61. The clamping surfaces of the pieces 45 and 46 are at slight angle with respect to each other, so that the normally flat spring 52 extending therebetween tends to swing the floating carrier block 46 downwardly, holding the face 62 on the underside of the pick-up head in resilient engagement with the edge of the film 19 (Figure 2).

From the above it will be apparent that the objects of the present invention are accomplished by the provision of a unique mounting for the magnetic pick-up head of a motion picture projector such that the position of the head may be adjusted in three planes, and that adjustments as to tangency may be made without altering either the facing adjustment or the azimuth adjustment. Similarly, adjustments of azimuth and facing may be accomplished without changing the adjustments already made, and the mount is such as to provide a relatively stable support for the magnetic head, yet afford the requisite degree of compliance to follow the film.

With the pivotal adjustment means as described above, the primary mounting bracket 21—22, the secondary mounting bracket 33—34 and head carrier assembly 45—46 are each shiftable by rotation upon an independent pivoted axis, and it is to be noted that the axes of the three pivots supporting these parts are mutually perpendicular. It follows that the alignment of the flux gap of the pick-up head may be independently adjusted in all three dimensions, while the spring hinge mount provides enough yieldability in the carrier to afford adequate compliance in the head to follow the film. In addition, it is to be noted that the pivot 32 between the primary and secondary brackets and the pivot 44 between the secondary bracket and the head carrier are ararnged so that each of their axes pass through the point of contact between the film strip and the flux gap of the pick-up head. It follows that adjustment of these pivots and consequent adjustment of the facing and azimuth of the pick-up head can be made without altering any other adjustments previously accomplished.

While the precise form of the invention chosen for illustration in this specification has been designed for attachment to a particular form of projector, yet it will be appreciated that the same principles may be used in connection with other type of projectors as well as with cameras or other related equipment, since the present teachings are applicable to recording, reproducing and erasing heads alike.

Having thus described my invention, what I claim as new and desire to secure by United States Letters Patent is:

1. In a motion picture machine having a frame, a sound drum spaced from the frame and rotatable on an axis perpendicular thereto, and a strip of motion picture film passing around the sound drum, with an edge of the film overhanging one edge of the drum and extending toward the frame with a magnetic sound track along said overhanging edge, the combination of a magnetic transducer head positioned between the sound drum and the frame to engage the edge of the film in sliding engagement with the sound track thereon; together with adjustable head mounting means consisting of a first pivot affixed to the frame with its axis parallel to the axis of the sound drum and disposed outside of the periphery of said drum; a primary mounting bracket having a base and a mounting flange perpendicular to each other, with the mounting flange secured to the frame by the aforementioned first pivot; a second pivot affixed to the base of the primary supporting bracket with its axis perpendicular to the axis of the first pivot; a secondary mounting bracket having a base and an arm generally perpendicular to each other with the base of the secondary mounting bracket carried by said second pivot; a third pivot affixed to the arm of the secondary mounting bracket with its axis perpendicular to the axes of the first and second pivots, and a head carrier bracket mounted on said third pivot and extending between the sound drum and the frame and supporting the aforementioned transducer head; with separate and independent means for shifting the relative positions of each of said brackets about each of said pivots and independent locking means for securing them in adjusted relation with respect to each other.

2. The combination of claim 1 wherein the said second and third pivots are so related that the axes thereof would form an intersection at the surface of contact between the film and the magnetic transducer head.

3. In a motion picture machine having a frame, a sound drum spaced from the frame and rotatable on an axis perpendicular thereto, and a strip of motion picture film passing around the sound drum, with an edge of the film overhanging one edge of the drum and extending toward the frame with a magnetic sound track along said overhanging edge, the combination of a magnetic transducer head positioned between the sound drum and the frame to engage the edge of the film in sliding engagement with the sound track thereon; together with adjustable head mounting means consisting of a first pivot affixed to the frame with its axis parallel to the axis of the sound drum and disposed outside of the periphery of said drum; a primary mounting bracket having a base and a mounting flange perpendicular to each other, with the mounting flange secured to the frame by the aforementioned first pivot; a second pivot affixed to the base of the primary supporting bracket with its axis perpendicular to the axis of the first pivot; a secondary mounting bracket having a base and an arm generally perpendicular to each other with the base of the secondary mounting bracket carried by said second pivot; a third pivot affixed to the arm of the secondary mounting bracket with its axis perpendicular to the axes of the first and second pivots, and a head carrier bracket mounted on said third pivot and extending between the sound drum and the frame and supporting the aforementioned transducer head.

4. The combination of claim 3 wherein the said second and third pivots are so related that the axes thereof would form an intersection at the surface of contact between the film and the magnetic transducer head.

5. In an apparatus including a magnetic transducer head, an adjustable head mounting means comprising in combination, a first pivot, a primary mounting bracket having a base and a mounting flange perpendicular to each other, with the mounting flange carried by the aforementioned first pivot; a second pivot affixed to the base of the primary supporting bracket with its axis perpendicular to the axis of the first pivot, a secondary mounting bracket having a base and an arm generally perpendicular to each other with the base of the secondary mounting bracket carried by said second pivot; a third pivot affixed to the arm of the secondary mounting bracket with its axis perpendicular to the axes of the first and second pivots, and a head carrier bracket mounted on said third pivot and supporting the aforementioned transducer head; with separate and independent means for shifting the relative positions of said brackets and carrier about each of said pivots and independent locking means for securing them in adjusted relation with respect to each other.

6. The combination of claim 5 wherein the said second and third pivots are so related that the axes thereof would form an intersection at the magnetic transducer head.

References Cited in the file of this patent

UNITED STATES PATENTS

| | | |
|---|---|---|
| 2,644,856 | Pettus | July 7, 1953 |
| 2,705,640 | Del Valle | Apr. 5, 1955 |
| 2,721,743 | Erikson et al. | Oct. 25, 1955 |
| 2,776,144 | Nichols | Jan. 1, 1957 |